(12) United States Patent
Pederson

(10) Patent No.: US 8,330,599 B2
(45) Date of Patent: Dec. 11, 2012

(54) INTELLIGENT OBSERVATION AND IDENTIFICATION DATABASE SYSTEM

(75) Inventor: John C. Pederson, St. Cloud, MN (US)

(73) Assignee: John C. Pederson, St. Cloud, MN (US)

( * ) Notice: Subject to any disclaimer, the term of this patent is extended or adjusted under 35 U.S.C. 154(b) by 0 days.

(21) Appl. No.: 13/479,724

(22) Filed: May 24, 2012

(65) Prior Publication Data

US 2012/0229649 A1  Sep. 13, 2012

Related U.S. Application Data

(63) Continuation of application No. 13/041,593, filed on Mar. 7, 2011, now Pat. No. 8,188,861, which is a continuation of application No. 12/254,587, filed on Oct. 20, 2008, now Pat. No. 7,902,978, which is a continuation of application No. 10/646,853, filed on Aug. 22, 2003, now Pat. No. 7,439,847.

(60) Provisional application No. 60/405,592, filed on Aug. 23, 2002, provisional application No. 60/405,379, filed on Aug. 23, 2002.

(51) Int. Cl.
*G05B 19/00* (2006.01)

(52) U.S. Cl. ........ 340/541; 340/937; 340/540; 436/900; 348/159

(58) Field of Classification Search ........................ None
See application file for complete search history.

(56) References Cited

U.S. PATENT DOCUMENTS

| | | | |
|---|---|---|---|
| 2,082,279 A | 6/1937 | Fore |
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 4,149,111 A | 4/1979 | CoatesJr |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |

(Continued)

FOREIGN PATENT DOCUMENTS

DE  4304216  8/1994

(Continued)

*Primary Examiner* — Eric M Blount
(74) *Attorney, Agent, or Firm* — Vidas, Arrett & Steinkraus, P.A.

(57) ABSTRACT

An intelligent video/audio observation and identification database system may define a security zone or group of zones. The system may identify vehicles and individuals entering or exiting the zone through image recognition of the vehicle or individual as compared to prerecorded information stored in a database. The system may alert security personnel as to warrants or other information discovered pertaining to the recognized vehicle or individual resulting from a database search. The system may compare images of a suspect vehicle, such as an undercarriage image, to standard vehicle images stored in the database and alert security personnel as to potential vehicle overloading or foreign objects detected, such as potential bombs. The system may track individuals or vehicles within a zone or between zones. The system may further learn the standard times and locations of vehicles or individuals tracked by the system and alert security personnel upon deviation from standard activity.

20 Claims, 7 Drawing Sheets

U.S. PATENT DOCUMENTS

| | | |
|---|---|---|
| 4,336,580 A | 6/1982 | Mouyard |
| 4,342,944 A | 8/1982 | SpringThorpe |
| 4,368,979 A | 1/1983 | Ruell |
| 4,434,510 A | 2/1984 | Lemelson |
| 4,445,132 A | 4/1984 | Ichikawa |
| 4,556,862 A | 12/1985 | Meinershagen |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,954,822 A | 9/1990 | Borenstein |
| 4,965,644 A | 10/1990 | Kawabata |
| 4,966,862 A | 10/1990 | Edmond |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,060,303 A | 10/1991 | Wilmoth |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,182,647 A | 1/1993 | Chang |
| 5,186,547 A | 2/1993 | Muhl |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,496 A | 8/1996 | Kimoto |
| 5,552,780 A | 9/1996 | Knockeart |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,634,287 A | 6/1997 | Lamparter |
| 5,634,711 A | 6/1997 | Kennedy |
| 5,635,902 A | 6/1997 | Hochstein |
| 5,635,981 A * | 6/1997 | Ribacoff ..................... 348/156 |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,710,833 A | 1/1998 | Moghaddam |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,785,418 A | 7/1998 | Hochstein |
| 5,786,918 A | 7/1998 | Suzuki |
| 5,789,768 A | 8/1998 | Lee |
| 5,793,062 A | 8/1998 | KishJr |
| 5,796,376 A | 8/1998 | Banks |

| | | |
|---|---|---|
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,826,965 A | 10/1998 | Lyons |
| 5,828,055 A | 10/1998 | Jebens |
| 5,831,155 A | 11/1998 | Hewitt |
| 5,831,669 A | 11/1998 | Adrain |
| 5,838,024 A | 11/1998 | Masuda |
| 5,838,247 A | 11/1998 | Bladowski |
| 5,838,259 A | 11/1998 | Tonkin |
| 5,848,837 A | 12/1998 | Gustafson |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,939,996 A | 8/1999 | Kniveton |
| 5,946,417 A | 8/1999 | Bonneau |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,086,229 A | 7/2000 | Pastrick |
| 6,091,025 A | 7/2000 | Cotter |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,204,762 B1 | 3/2001 | Dering |
| 6,243,492 B1 | 6/2001 | Kamei |
| 6,249,340 B1 | 6/2001 | Jung |
| 6,268,788 B1 | 7/2001 | Gray |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 * | 4/2002 | Rzyski ............................ 348/61 |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,424,269 B1 | 7/2002 | Pederson |
| 6,461,008 B1 | 10/2002 | Pederson |
| 6,462,669 B1 | 10/2002 | Pederson |

| | | |
|---|---|---|
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,547,410 B1 | 4/2003 | Pederson |
| 6,590,343 B2 | 7/2003 | Pederson |
| 6,590,502 B1 | 7/2003 | Pederson |
| 6,600,274 B1 | 7/2003 | Hughes |
| 6,614,359 B2 | 9/2003 | Pederson |
| 6,623,151 B2 | 9/2003 | Pederson |
| 6,690,294 B1 * | 2/2004 | Zierden ..................... 340/937 |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,822,578 B2 | 11/2004 | Pederson |
| 6,879,263 B2 | 4/2005 | Pederson |
| 6,892,942 B2 * | 5/2005 | Widl et al. .................... 235/384 |
| 6,894,617 B2 | 5/2005 | Richman |
| 6,956,477 B2 | 10/2005 | Chun |
| 6,972,693 B2 * | 12/2005 | Brown et al. ................. 340/907 |
| 7,023,469 B1 * | 4/2006 | Olson .......................... 348/152 |
| 7,046,160 B2 | 5/2006 | Pederson |
| 7,102,665 B1 * | 9/2006 | Chandler et al. .............. 348/148 |
| 7,103,614 B1 * | 9/2006 | Kucik ........................... 340/937 |
| 7,183,895 B2 * | 2/2007 | Bazakos et al. ................ 340/5.7 |
| 2003/0025608 A1 | 2/2003 | Pederson |
| 2003/0137424 A1 * | 7/2003 | Gehlot et al. ............... 340/573.4 |
| 2003/0156037 A1 | 8/2003 | Pederson |
| 2003/0169164 A1 | 9/2003 | Lau |
| 2003/0185340 A1 * | 10/2003 | Frantz ............................. 378/57 |
| 2005/0055582 A1 * | 3/2005 | Bazakos et al. ................ 713/202 |
| 2005/0057941 A1 | 3/2005 | Pederson |

FOREIGN PATENT DOCUMENTS

| | | |
|---|---|---|
| DE | 19502735 | 8/1996 |
| DE | 2971228 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| FR | 2658024 | 8/1991 |
| FR | 2680861 | 3/1993 |
| FR | 2707222 | 1/1995 |
| FR | 2800500 | 5/2001 |
| GB | 1231369 | 5/1971 |
| GB | 2069257 | 8/1981 |
| GB | 2111270 | 6/1983 |
| GB | 2139340 | 11/1984 |
| GB | 2175428 | 11/1986 |
| GB | 2240650 | 8/1991 |
| GB | 2272791 | 5/1994 |
| GB | 2294245 | 4/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | 06333403 | 12/1994 |
| JP | 08002341 | 1/1996 |
| WO | 9750070 | 12/1997 |

| WO | 9942985 | 8/1999 | WO | 0110674 | 2/2001 |
| WO | 9949435 | 9/1999 | WO | 0110675 | 2/2001 |
| WO | 9949446 | 9/1999 | | | |
| WO | 0074975 | 12/2000 | | | |

\* cited by examiner

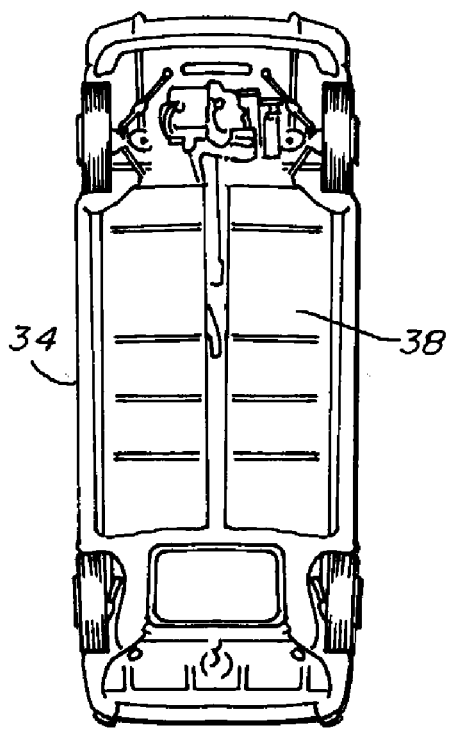 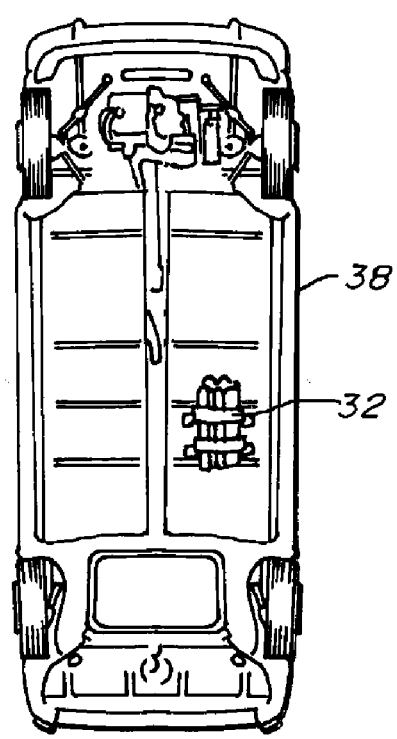
*Fig.4.*   *Fig.4A.*
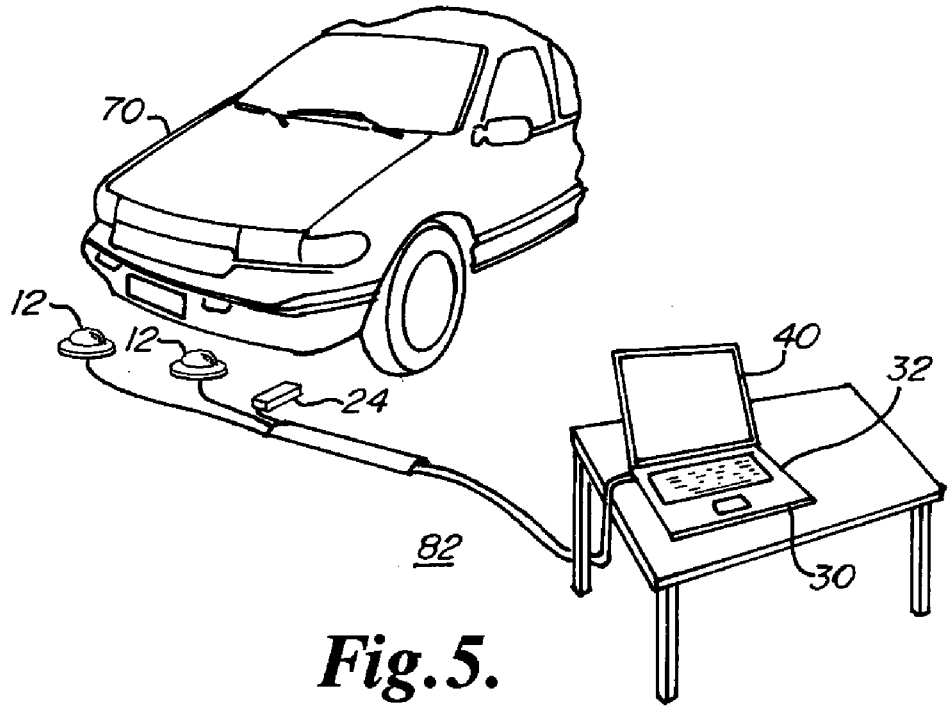
*Fig.5.*

INTELLIGENT OBSERVATION AND IDENTIFICATION DATABASE SYSTEM

CROSS-REFERENCE TO RELATED APPLICATIONS

This application is a Continuation application from U.S. patent application Ser. No. 13/041,593 filed Mar. 7, 2011 issued as U.S. Pat. No. 8,188,861 on May 29, 2012, the disclosure of which is expressly incorporated by reference herein. This application is also a Continuation application from U.S. patent application Ser. No. 12/254,587, filed Oct. 20, 2008 issued as U.S. Pat. No. 7,902,978; which is a Continuation application from U.S. patent application Ser. No. 10/646,853, filed Aug. 22, 2003, issued as U.S. Pat. No. 7,439,847; which claims priority from U.S. Provisional Applications 60/405,592 and 60/405,379, both filed Aug. 23, 2002 the contents of which are hereby incorporated by reference in their entireties.

BACKGROUND OF THE INVENTION

In the past law enforcement officers, surveillance, or security personnel attempting to identify vehicles and/or occupants of vehicles have observed a license plate without the use of a camera or an optical input device other than eyeglasses. An officer or security guard was thereby required to be sufficiently close to a vehicle to observe the license plate. The presence of the officer was thereby often revealed to the occupant of the vehicle under investigation. The failure to use optical input devices has slowed down or delayed the timing for vehicle identification as well as the identification of the vehicle owner and make or model for the vehicle. In addition the communication of information to an officer or guard as to the criminal history of the likely driver or registered owner of the vehicle was also delayed.

In the past upon the identification of a license plate an officer frequently manually entered the license plate number into a keypad to initiate access to a database which distracted the officer's attention from the vehicle. An officer was thereby less likely to observe erratic or otherwise suspicious driving characteristics for the vehicle. The safety to the officer and/or to other individuals was thereby reduced. It is desirable to identify the ownership of a vehicle, in that, rental vehicles may have a higher probability of including an explosive device.

In the past following entry of a license plate number into a keypad, a communication link was required to access a database to retrieve desired information such as the make, model, registration, listed owner, status of license tabs, insurance status, outstanding violations, individual identification, outstanding warrants, or other information. The data link permitted the display of the retrieved information onto a screen mounted for observation by an officer or guard. The officer or guard was then required to view the screen to become advised of the desired information, again distracting the officer from a vehicle or occupant under investigation. No processor was known to intelligently and/or automatically evaluate or filter information retrieved from a database in real time, to identify a potentially dangerous condition or a necessity to implement a more detailed inquiry related to a vehicle. No warning signal was known to automatically warn an officer as to the existence of a potentially dangerous situation or a condition requiring further investigation.

Some squad vehicles, checkpoints, and/or guard stations include photographic equipment such as cameras and/or video recorders to assist in the observation of vehicles or license plates for vehicles. Generally this type of optical equipment is expensive and not available for all police or emergency vehicles or restricted access locations. In addition the use of cameras, video equipment, or optical visual assist devices continues to require an officer or guard to manually enter a license plate number into a keypad duplicating the disadvantages as identified above. A need therefore exists for a device and method to intelligently and automatically observe a license plate for conversion into a digital format for comparison in real time to a database to identify information related to the vehicle and/or the vehicle occupant.

Following the retrieval of information from a database, an officer, security, or surveillance personnel normally cleared the information from a vehicle display. In the past, generally no record of any access or prior investigation was made or stored for future reference by the law, security, or surveillance personnel and/or officers. In the past, it has not been known to make an environmentally specific database for a security zone of vehicles to identify the number and identity of each vehicle within the security zone which may include, but is not necessarily limited to, a garage, hospital, school, and/or an airport parking lot any particular point in time.

No system was known which identified vehicle license plates and vehicles, created a database, and tracked the vehicles within a specific security zone.

No system has also been known which enables an operator to search or screen a specifically accumulated database for a security zone for vehicles falling within a particular sub-class or group for implementation of a more detailed investigation by a security, surveillance, or law enforcement officer. In addition, no system is known which enables a security, surveillance, or law enforcement officer to either select one of many pre-programmed inquiries based upon profiles, searches, or screening functions in real time to implement a specific customized inquiry of the accumulated database to identify a specific target group of vehicles to receive further investigation.

In the past mirrors as mounted on an elongated handle or rolling mechanism have been used for positioning under a vehicle to enable inspection of the undercarriage of a vehicle. Generally the use of mirrors for inspection of the undercarriage of a vehicle have failed to provide the opportunity for a complete and detailed inspection of the vehicle. Alternatively individuals have placed themselves on hands and knees to attempt to look under a vehicle to perform an inspection to identify the presence of explosive devices.

As is known terrorists have secreted explosive devices within the undercarriage of a vehicle to perform a terrorist attack. In addition, in the past, a terrorist has attempted to hide the existence of an explosive or bomb under a cover as attached to the undercarriage of a vehicle. The existence of a cover alters the appearance of an undercarriage as compared to the appearance of a standard undercarriage for an identical vehicle. No intelligent and automatic method of recognizing the existence of an explosive, or the alteration of an undercarriage to hide an explosive, is known to detect the existence of an attempted terrorist attack.

Further, no device has been known to identify and track a person within a security zone absent affirmative actions by the person, or use of a trackable device by the person, such as a personalized keycard.

All U.S. patents and applications and all other published documents mentioned anywhere in this application are incorporated herein by reference in their entirety.

Without limiting the scope of the invention a brief description of some of the claimed embodiments of the invention are set forth below. Additional details of the described embodiments of the invention and/or additional embodiments of the invention may be found in the Detailed Description of the Invention below.

A brief abstract of the technical disclosure in the specification is provided as well, only for the purposes of complying with 37 C.F.R. 1.72. The abstract is not intended to be used for interpreting the scope of the claims.

BRIEF OR GENERAL DESCRIPTION OF THE INVENTION

The Intelligent Observation and Identification Database Alert System generally identifies, recognizes and provides real time information concerning a vehicle, group of vehicles, person or group of persons under investigation, where a processor screens a database to identify and name persons or vehicles to receive the highest priority of investigation. Vehicle information is immediately retrieved upon the activation of a camera, digital camera, video or audio recording device, or optically assisted recognition device as directed to a vehicle license plate. Real time information is thereby provided to an officer to assist in law enforcement or surveillance activities.

In one embodiment the present invention provides for the recognition of patterns within an accumulated continuously evolving database to access and initiate an investigation profile for vehicles located within, or adjacent to a security zone, where a lower priority category of vehicles are assigned based upon regular and recurring patterns of presence of the vehicle within a security zone.

In one embodiment the present invention provides for the identification and searching of vehicle license plates to identify and compare recorded optical images against previously stored data representative of the make, model, type, and description of the vehicle to verify the accuracy of the observed images as compared to the pre-stored data.

In one embodiment the present invention tracks entry and exit times of vehicles and/or persons entering and exiting a predetermined zone, and for entry of appropriate tracking information into a continuously evolving database.

In one embodiment the present invention learns over a period of time the typical entry and exit times of persons and/or vehicles and, under predetermined circumstances, alert security personnel as to changes in a routine.

These and other embodiments which characterize the invention are pointed out with particularity in the claims annexed hereto and forming a part hereof. However, for a better understanding of the invention and its advantages, reference should be made to the drawings which form a further part hereof, and to the accompanying descriptive matter, in which there are illustrated and described various embodiments of the invention.

BRIEF DESCRIPTION OF THE SEVERAL VIEWS OF THE DRAWING(S)

A detailed description of the invention is hereafter described with specific reference being made to the drawings.

FIGS. 4 and 4A depict a comparison of vehicle undercarriage images.

FIG. 5 depicts a mobile vehicle undercarriage observation and identification database system.

DETAILED DESCRIPTION

Figure 1:
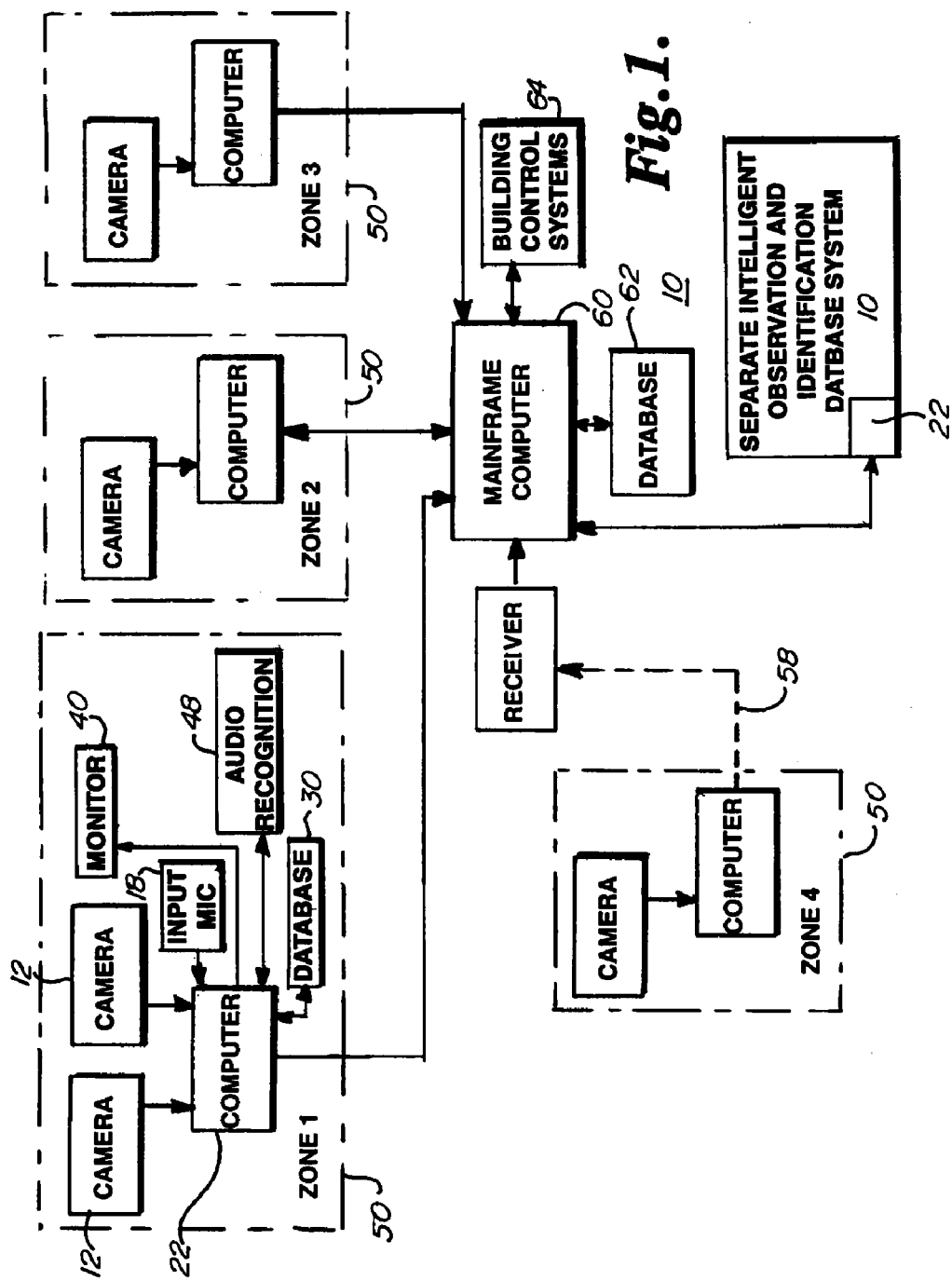
FIG. 1 shows a schematic view of an intelligent video/audio observation and identification database system according to the present invention.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In general, the intelligent video/audio observation and identification database system is utilized within a particular defined security zone or zones to track the entry, exit and location of vehicles and individuals, and to identify acceptable profile parameters for the vehicles within the security zone. The intelligent system is utilized to flag discrepancies related to information accessible and processed from a stored and accumulated continuously evolving database of information in order to warn security, surveillance, and/or law enforcement officers as to the existence of a condition warranting further investigation to minimize risk of danger, such as illegal activity or terrorist attacks.

The intelligent video/audio observation and identification database system will search and/or screen all vehicles entering into a security zone to identify information such as the license plate number, make, model, and type of vehicle along with a facial recognition optical image of vehicle occupants, the recording of the time, date, and place of entry into the secured zone and exit from the secured zone, and personal information concerning driver's license numbers, criminal records, driving records, and/or a comparison of a photographic image from a driver's license compared to the optical image obtained by the facial recognition camera.

The accumulation and storage of the information of the type identified above will be stored within particular continuously updated and evolving files to create a database for future reference to enable law enforcement, surveillance, and/or security officers to implement profile searches to identify classes of vehicles warranting further investigation to minimize risk of terrorist attacks. For instance, on a given day, a law enforcement, surveillance, and/or security officer could access the accumulated database to inquire as to the identity and location of all vehicles within a security zone which had been driven and/or occupied by individuals having a particular nationality and/or ethnic background. The processor associated with the intelligent video/audio observation and identification database system will then search the available database and identify all vehicles which fall within the class of vehicles under investigation. The processor associated with the intelligent video/audio observation and identification database system will then advise the law enforcement, surveillance, or security officers as to the location of each vehicle under investigation. The intelligent video/audio observation and identification database system may also be utilized in recognition of pedestrians.

The tracking of vehicles within the security zone is accomplished through the use of a plurality of optical devices which may be cameras, digital cameras, and/or other types of recording devices which are either mounted in a static and/or active position for recording of a specific field adjacent to, or within, the security zone. Each of the devices are preferably linked to a continuously evolving database to record information which may be processed and retrieved for use by security personnel. It is anticipated that a sufficient number of optical devices will be utilized such that the observation fields for each individual optical device overlap to provide continuous observation of all desired areas within the security zone.

Referring to FIG. 1, the intelligent observation and identification database system 10 generally comprises an optical input device 12, such as a camera, a computer 22, including a processor, a database 30, which may be an evolving database, which may be located inside the computer 22, and an output device 40, such as a monitor.

The system 10 may also include other input devices 18, such as fingerprint scanners, palm scanners, microphones, retinal scanners, and the like. The various other input devices 18 and optical input devices 12 may be classified into zones 50. The computer 22 thus may receive input from a plurality of zones 50. Further, each zone 50 may include its own computer 22 and evolving database 30. Each database 30 may contain predetermined information, such as license plate registration date, vehicle history and warrant data, standard images and descriptions of vehicles including front, side and rear profile and undercarriage images, vehicle specifications such as height, width, length, total unloaded weight, and any other available vehicle data, warrant data with respect to persons, personal identification information such as facial images and profile images of persons, fingerprint images, palm print images, voice samples and the like. Each evolving database 30 is also capable of being updated according to data saved by the system. Optionally, a plurality of computers 22 in a plurality of zones 50 may be in communication with each other, and also may be in communication with a mainframe computer 60 or server, which may have a mainframe database 62. When a number of zones 50 are linked to a mainframe computer 60, each zone 50 could alternatively be classified as a sub-zone, with the system 10 zone being the entire perimeter of all combined sub-zones.

An overview of the method utilized with the intelligent audio/visual observation and identification database system 10 initiates with the identification of a security zone 50. Next, individuals identify the positioning of optical assist and/or recording devices 12 to establish fields of observation to completely enclose the identified security zone 50. Individuals next place the optical input devices 12 in accordance with the identified desired positions for the optical input devices 12 to observe the security zone 50.

The optical input devices 12 are next connected to a network and computer 22 which may be centrally located within a security zone 50. Software is preferably loaded onto the computer 22 for creation of individual files representative of vehicles 70 and/or individuals 56. Access software is used to communicate with internal databases 30, 62 or external or remote databases, and comparison software is used to review data as related to the external and/or internal databases 30, 62. Sensitivity software is also used to establish thresholds and to issue/trigger investigation signals, which may be displayed on the output device or monitor 40, and category software is used to divide data within individual files or images captured by the input devices 12, 18 into coherent segments. In addition, any other software as desired by security and/or law enforcement personnel may be utilized. Individuals will next verify the operational status and accuracy of the computer 22 operation for the intelligent audio/visual observation and identification database system 10 to insure functioning prior to implementation. The computer 22 will then be connected to the individual security zone 50 network of optical input devices 12 for testing as to an operational status. Next, the computer 22 will be connected to a network comprised of a plurality of security zones 50 to insure operational communication therebetween.

Next the intelligent audio/visual observation and identification database system 10, including the optical input devices 12 and other input devices 18, will be initiated. The computer 22 will then accumulate data and build a database 30, 62 for observed vehicles 70 and individuals 56 within the individual security zone 50.

The optical input devices 12 will then observe vehicles 70 and individuals 56 where the computer 22 will access internal databases 30, 62 and external databases to identify the make and model of the vehicle, facial recognition of driver 56 and passengers, driver's license number, driving record, criminal history, expected load, and any other information related to the vehicle 70 and/or individual 56.

The computer 22 may next implement either standard or customized queries or searches for defined profiles related to individuals 56 and/or vehicles 70 within the accumulated database 30, 62 for the security zone 50. Upon identification of individuals 56 and/or vehicles 70 which satisfy the profile criteria, a communication signal will be generated to advise law enforcement, surveillance, or security zone 50 officers as to the status and location of the individuals 56 and/or vehicles 70 under investigation.

The computer 22 may then additionally access the network of the plurality of security zones 50 for transmission of search requests and/or information as related to a current condition within the initial security zone 50. These inquiries may be global, or may be limited to specific periods of time or other specific conditions.

Figure 2:
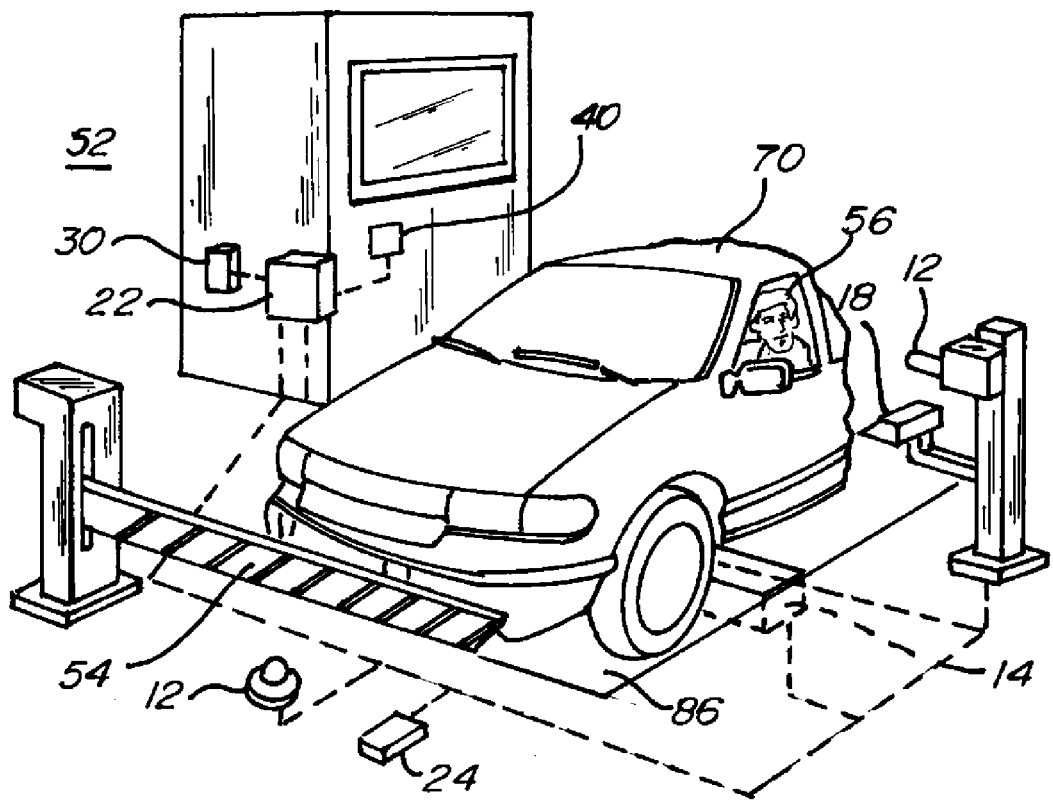
FIG. 2 depicts an actual installation of an intelligent video/audio observation and identification database system according to the present invention.
Figure 2A:
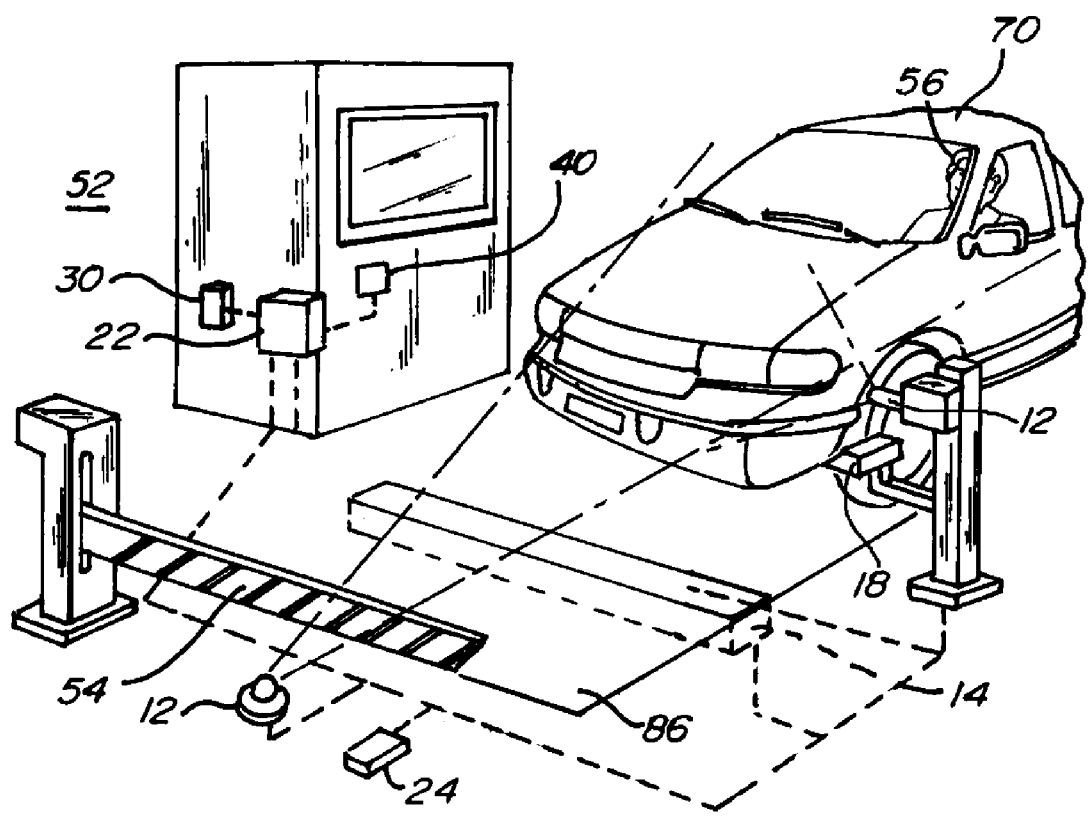
FIG. 2A depicts an embodiment of the intelligent video/audio observation and identification database system according to the present invention.

FIG. 2 depicts an entry point or security checkpoint 52, which may comprise a zone 50. The intelligent observation and identification database system 10 preferably utilizes an observation post or checkpoint 52 at an entrance or an exit to a secured zone 50 to optically observe and input, at both the entrance and the exit, information to record and store within the database 30 for identification of regular and repetitive conduct of specific vehicles 70 or individuals 56 within the security zone 50. In addition, other types of recognition such as facial recognition, fingerprint recognition, palm print recognition, voice print recognition, eye scan, and/or signature recognition may be coupled to the input devices 12, 18 for recording of data to be automatically accessed and stored by the intelligent video/audio observation and identification database system 10.

As a vehicle 70 approaches the checkpoint 52, the intelligent video/audio observation and identification database system 10 desirably employs a plurality of input devices 12, 18 to record images related to the vehicle 70 and its occupants 56. Optical input devices 12 may include cameras, digital cameras and charge-coupled devices such as disclosed in U.S. Pat. No. 5,182,647 to Chang, the disclosure of which is incorporated herein by reference, video cameras, scanners and any other appropriate devices to record an image. The optical input device 12 desirably records a digital image for analysis by the computer 22. If the optical input device 12 does not record a digital image, the system 10 desirably includes a digital converter to convert the image to a digital format.

The computer 22 for the intelligent audio/visual observation and identification database system 10 preferably is sufficiently sophisticated for tracking of a vehicle 70 and/or individual 56 as the vehicle 70 and/or individual 56 passes through a plurality of independent optical input devices 12 or other input devices 18 as previously discussed. In this regard, the computer 22 receives data independently from one or more input devices 12, 18 for analysis against pre-stored and/or prerecorded data in the database 30 related to the vehicle 70 and/or individual 56. In this regard, it is not required that the first optical input device 12 observe all relevant data related to a vehicle 70 and/or individual 56. For example, a first optical input device 12 may recognize a license plate 54, but due to the alignment of the vehicle 70 with the optical input device 12, the side profile of the vehicle 70 may not be readily ascertained. As the vehicle 70 approaches and passes into the viewing area of additional optical input devices 12, a perpendicular observation alignment may occur where the side profile and loading of the vehicle 70 may be readily ascertained. It is therefore anticipated that the intelligent audio/visual observation and identification database system 10 simultaneously and continuously receives data from all input devices 12, 18 for processing for identification, observation, tracking, and identifying an individual 56 or vehicle 70. All input data may further be stored within a continuously evolving database 30.

Optical input devices 12 are desirably arranged to record images of the vehicle 70 license plate 54 and of the face of the driver 56 and passengers. The devices 12 may also record images related to the front, rear, and side profiles of the vehicle 70.

The intelligent video/audio observation and identification database system 10 desirably records an image of the license plate 54 for storage of the license plate 54 number, the time and date of the recording, and digital images representative of the vehicle 70, driver 56 and passengers, including appearance characteristics.

The optical input device 12 may include a flash for proper image recording in low light conditions, such as at night or within a building enclosure. The optical input devices 12 desirably will include exposure control sensors, such as anti-blooming and antismear sensors to prevent blooming and smearing of images, for example as may be caused by headlights.

Often it is desirable to keep the input devices 12, 18 hidden from view of the motorists. The input devices 12, 18 may be disguised or hidden from view within various enclosures. For example, FIG. 2 depicts an input device 12 positioned to record a vehicle 70 license plate 54 that is mounted in the ground, having only a small dome protruding above the road surface.

When the input devices 12, 18 are hidden, or when the use of a visible flash is undesirable, the system 10 may make use of IR flashes, which generally produce light not visible to the human eye and can include an IR bandpass filter to completely remove visible light. The optical input devices 12 should be adapted to record images based from the IR light and adjust the recorded image to be visible by the human eye, or to adjust the exposure control as disclosed in U.S. Pat. No. 5,809,161 to Auty et al., the disclosure of which is incorporated herein by reference.

When an image of the vehicle 70 license plate 54 is recorded, the computer 22 may analyze the image to determine the license plate 54 number. Desirably, the computer 22 performs an optical character recognition (OCR) to extract the data pertaining to license plate 54 characters from the digital image and convert the data into standard alphanumeric characters, such as ASCII text. An example of OCR is described in U.S. Pat. No. 5,875,261 to Fitzpatrick et al., the disclosure of which is incorporated herein by reference.

Once the license plate 54 has been converted to computer 22 readable characters, the computer 22 will access the evolving database 30 information to allow for verification of the make, model, vehicle type and the registered driver 56. Further, the computer 22 is able to check the criminal history and driving history related to the license plate 54. Thus, as a vehicle 70 approaches a checkpoint 52, the license plate 54 may be read, and the computer 22 may display the expected driver 56 and vehicle information on the monitor 40 for security personnel. Further, if the database 30 search reveals any warrants on the vehicle 70 or expected driver 56, the computer 22 may alert security personnel.

Figure 3:
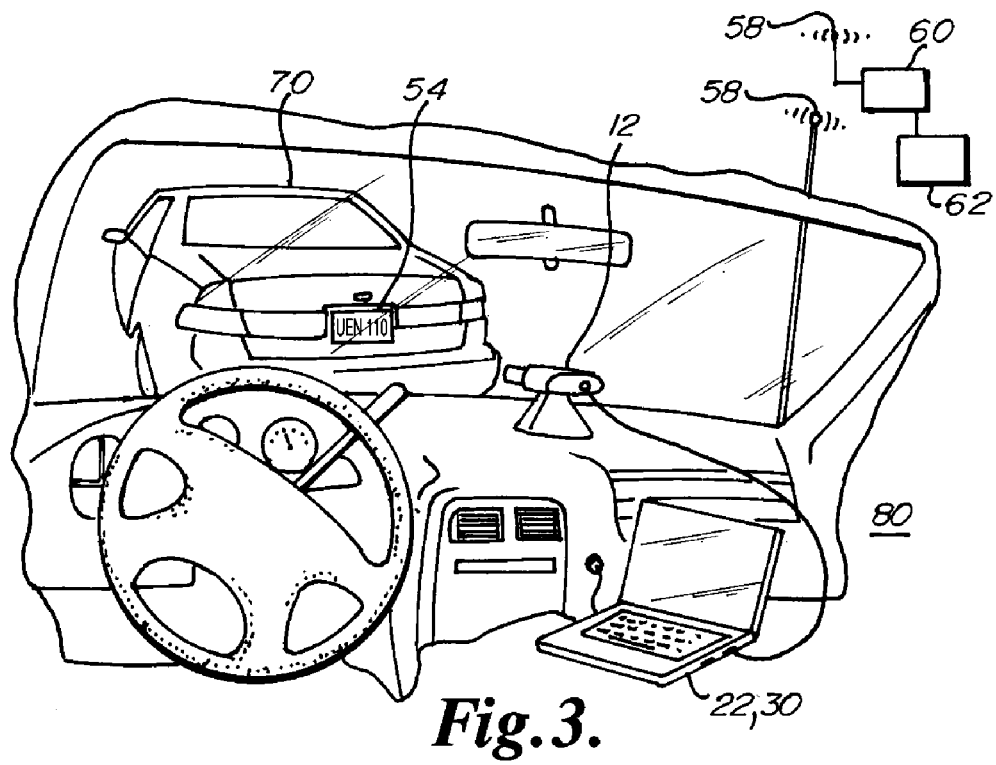
FIG. 3 depicts a mobile intelligent observation and identification database system according to the present invention.

It should be noted that the license plate 54 image and character recognition portion of the system 10 may alternatively be utilized as a portable apparatus, for example within a police or security vehicle, as depicted in FIG. 3. As such, the portable apparatus may comprise a portable license plate 54 recognition and information retrieval apparatus 80. The security or police personnel will then have a complete automatic description of the vehicle 70 associated with the license plate 54, and any history associated with the vehicle 70 and registered owner or of the vehicle 70. The database 30 may be located within the patrol vehicle, while a wireless connection 58 may be utilized to facilitate communication with a mainframe computer 60 or mainframe database 62.

Referring again to FIG. 2 and a security checkpoint 52, the system 10 may also include one or more optical input devices 12 positioned beneath the vehicle 70 in order to record an image of the vehicle undercarriage. The undercarriage optical input devices 12 may be mounted beneath the road surface, flush with the road surface or protruding from the road. Desirably, protrusion above the ground will be kept to a minimum. The undercarriage optical input devices 12 may be coupled to lights or IR lights to illuminate the areas to be observed. The under-vehicle input devices 12 may comprise scanners 14 to scan an image which more closely represents a scale image of the undercarriage, without perspective skewing of the image. In either case, the computer 22 may include software to stretch and skew the recorded undercarriage image to match a predetermined scale. Further, the system 10 may include a speed determining device 24, such as a radar gun, to actively evaluate the rate of displacement of the vehicle 70 during recording of the image, so that the computer 22 may adjust the recorded information to produce an accurate scaled image.

FIGS. 4 and 4A depict two similar vehicle undercarriages. The computer 22, upon the receipt of information concerning the make and model of the vehicle 70, as provided by the license plate 54 reader, may access the database 30 for retrieval of a pre-recorded undercarriage image 34 representative of the blueprint or undercarriage of the identified make and model for the vehicle 70. The input device 12 preferably stores the observed undercarriage image 36 of the inspected vehicle 70 within memory as a file related to the undercarriage of the vehicle 70 under investigation. The computer 22 may then display both the pre-recorded undercarriage image 34 and the observed undercarriage image 36 on the monitor 40 for comparison by security personnel.

Alternatively, the computer 22 may automatically compare the observed undercarriage image 36 of the vehicle 70 to the pre-recorded undercarriage image 34 of a standard vehicle of the identical make and model.

Automatic image comparing by the computer may be accomplished by any method known in the art, desirably by probabilistic analysis such as thresholding of color and intensity of pixels, shape-plus-texture methods, Principle Component Analysis (PCA) and Eigenvector or Eigenspace decomposition analysis. Example methods of image analysis are disclosed in U.S. Pat. No. 5,035,055 to Wang et al., U.S. Pat. No. 5,164,992 to Turk et al., U.S. Pat. No. 5,710,833 to Moghaddam et al., U.S. Pat. No. 6,035,074 to Fujimoto et al., U.S. Pat. No. 6,072,893 to Luo et al., U.S. Pat. No. 6,181,805 to Koike et al., U.S. Pat. No. 6,389,155 to Funayama et al. and U.S. Pat. No. 6,400,828 to Covell et al., the disclosures of which are incorporated herein by reference.

In the event that the observed undercarriage image 36 of the vehicle 70 matches the pre-stored image 34 for the vehicle 70 within predetermined tolerances, then the computer 22 may issue a pass signal to an officer, indicating that the system 10 has determined from the undercarriage image that the vehicle 70 matches the license plate 54, and that the system 10 has not detected suspicious items from the undercarriage image. Alternatively, in the event that differences are identified between the observed undercarriage 36 of the vehicle 70 and the prerecorded image 34 for the undercarriage of the vehicle, then the computer 22 may immediately communicate to a law enforcement, surveillance, or security officer a hold, warning or instruction to investigate signal.

In the event that the observed undercarriage image 36 of the vehicle 70 does not match the pre-stored image 34 for the vehicle within predetermined tolerances, the computer 22 may be programmed to react differently under various circumstances. If the images 34 and 36 are substantially similar except for a concentrated area of dissimilarity 32, as depicted in FIG. 4A, the computer 22 may issue an alert signal to security personnel to investigate the dissimilarity 32. Such a dissimilarity 32 may be due to an explosive device, hiding persons or other smuggled materials.

If substantial portions of the images 34 and 36 do not match, especially when there are multiple discrepancies detected both fore and aft of the floor pans 38, then the computer 22 may indicate that the vehicle determination according to the license plate 54 (the prerecorded image 34) does not match the actual vehicle 70 as observed. Thus, the computer 22 can initiate an investigation as to the type of vehicle 70 and accompanying license plates 54.

The computer 22 may also initiate a search of the database 30, 62 and attempt to identify the vehicle 70 by matching the observed undercarriage 36 with one or more of the prerecorded vehicle undercarriage images stored in the database 30, 62.

In an alternative embodiment, a computer 22 may combine observed recorded images 36 for the undercarriage of a vehicle 70 where no pre-screening of the license plate 54 has occurred. In this embodiment the computer 22 will directly search all available data representative of undercarriages of vehicles in the database 30 to attempt to match a previously stored database image 34 to the observed undercarriage image 36 as described above. The computer 22 may then communicate to a security or law enforcement officer the make and/or model representative of the match between the recorded image 36 of the vehicle 70 undercarriage to the pre-stored database image 34 for the vehicle undercarriage, whereupon the security officer may visually verify the make and model for the vehicle 70. In the event of a discrepancy the law enforcement or security officer may then initiate further investigation of the vehicle 70. In this embodiment, such as depicted in FIG. 5, the system may be portable and comprise a portable vehicle undercarriage identification and screening system 82.

In such a portable system 82, it is desirable to record an observed undercarriage image 36 and have the computer 22 scan the database 30 for likely matches. The computer 22 may then select the most likely prerecorded undercarriage image 34 match for comparison. Alternatively, the computer may display a predetermined number of likely but differing matches, for example different makes or models of vehicles, in order of rank according to probability of the match, thus allowing an operator or security person to select the actual vehicle and corresponding prerecorded undercarriage image 34 for use in comparing to the observed undercarriage image 36. The computer 22 may then proceed with a comparison as described above.

Referring again to FIG. 2, the intelligent video/audio observation and identification database system 10 preferably includes a database which will include any number of pre-stored images representative of undercarriage and front, side and rear profiles of different models, makes, and years of vehicles. Thus, the optical input devices 12 may record front, rear and/or side profile images of the vehicle 70 under investigation for comparison to prerecorded images stored in the database 30 of front, rear and/or side profile images. Thus, similarly to the method of comparison described above, the system 10 may determine an expected vehicle based upon the license plate 54 identification, and compare a prerecorded profile image from the database 30 to an actual profile image of the vehicle 70. Thus, the system 10 may either verify that the make and model of the actual vehicle 70 matches the expected vehicle make and model as determined from the license plates 54, or indicate a discrepancy and alert security personnel.

Further, some embodiments of the system 10 may use observed front, rear and/or side profile images in determining the appropriate prerecorded undercarriage image 34 to select for comparison with an observed undercarriage image 36.

Other embodiments may include programming for the computer 22 to initially attempt to identify the make, model, and year for a vehicle 70 prior to the retrieval of pre-stored images 34 representative of the undercarriage for the target vehicle 70. The computer 22 then may verify the observed image 36 and prerecorded image 34 for the undercarriage of the vehicle 70 to issue a pass, hold, and/or warning signal to a security officer. The computer 22 may alternatively select any number of options of variations for the undercarriage of a particular make and model of vehicle to expedite the comparison between the observed and recorded image to the information as stored within the computer 22 database. For example, some vehicles have optional features that change the undercarriage and profile views of the vehicle 70. Desirably, the database will contain prerecorded images 34 for all factory variations of all vehicles available for sale in the United States.

Figure 6:
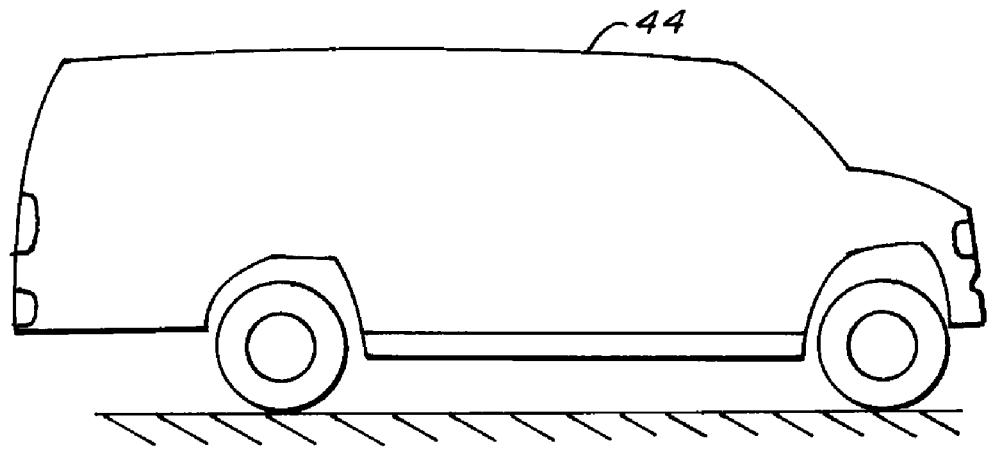
FIGS. 6 and 6A depict a comparison of vehicle side profiles.
Figure 6A:
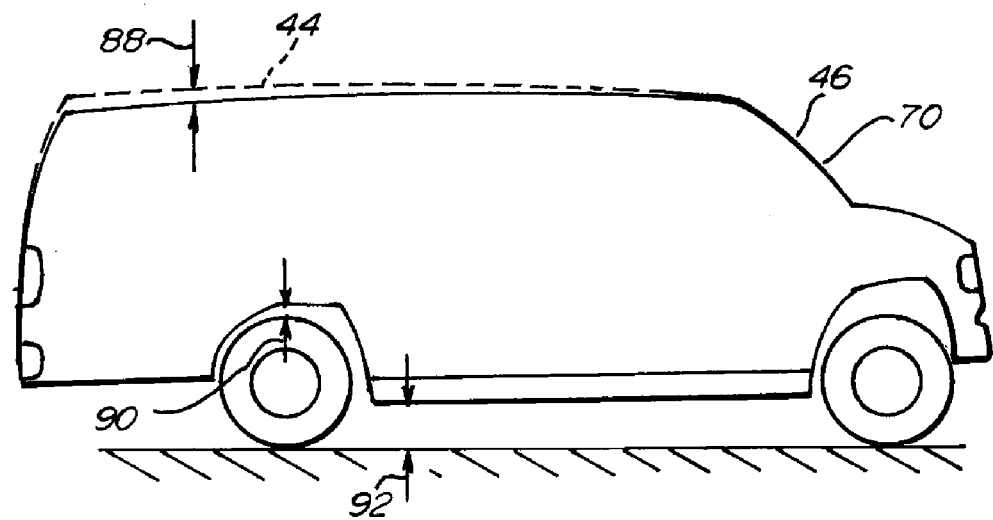

The intelligent video/audio observation and identification database system 10 may analyze a profile image of a vehicle 70, desirably a side or rear view profile image, to determine probable overloading of the vehicle 70. For example, as shown in FIGS. 6 and 6A, the computer may compare a prerecorded profile 44 of a vehicle 70 in the database 30 to the actual observed profile 46 of the vehicle 70 being investigated. The system may determine probable overloading of a vehicle 70 based upon discrepancies between the prerecorded profile 44 and the observed profile 46, such as a deflected profile line 88, a reduced wheel clearance 90 or a reduced ground clearance 92. Indication of increased loading of a vehicle 70 could indicate the presence of contraband, persons or explosive devices within the vehicle 70.

Referring to FIG. 2, the intelligent video/audio observation and identification database system 10 may include a scale platform 86, or other apparatus for determining the actual weight of the vehicle 70. The actual recorded weight is desirably compared to the typical weight of a stock vehicle, which is desirably contained in the database 30. If the actual weight is higher than the typical stock weight by a predetermined amount, the system 10 may signal to security personnel to investigate.

In some embodiments, as described below, the system 10 may have the capability of determining the number of visible vehicle occupants 56 and identifying the occupants 56. When this information is available to the system 10, the computer 22 may be programmed to account for the expected weight of each detected occupant. Thus, the predetermined amount of weight differential between the actual weight and the typical stock weight may be increased according to the expected weight of the vehicle occupants 56.

Upon detection of any threshold discrepancies related to the vehicle 70 itself, the computer 22 for the intelligent video/audio observation and identification database system 10 will issue a flag to a security officer to stop, hold, and/or investigate the vehicle 70 and to temporarily refuse entrance into the security zone 50. The optical input devices 12 and scale 86 thereby provide enhanced safety to the security zone 50 functioning as a proactive automatic screening system to prohibit and to apprehend potential criminals and terrorists prior to entry into a secured location or zone 50.

Figure 7:
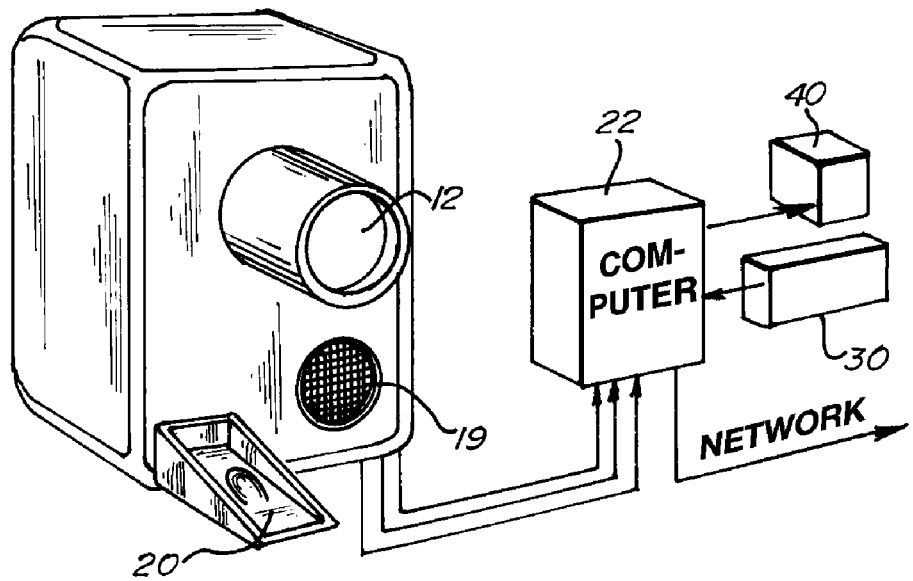
FIG. 7 depicts a mobile intelligent observation and identification database system according to the present invention.

The intelligent video/audio observation and identification database system 10 may include optical input devices 12 arranged to record an image of the vehicle occupants 56. Desirably the input devices 12 are positioned to record a front view and/or a side profile of the various occupants 56. The system 10 may also include other input devices 18 to record input data from the driver 56 and passengers. For example, an other input device 18 may be a fingerprint scanner, palm scanner, retinal scanner, microphone, etc. FIG. 7 depicts an embodiment of a system 10 which may include an input unit having an optical input device 12, and other input devices such as a microphone 19 and a thumbprint scanner 20. Such an embodiment of a system 10 may be useful at a remote checkpoint 52.

Personal data recorded from the vehicle occupants 56, such as photo images, finger or thumbprints, palm prints, retinal scans and voice captures, may be compared to similar prerecorded files stored in the database 30 in order to verify and/or identify the vehicle occupants 56. Thus, it is desirable for the database 30 to contain relevant information of all persons who regularly pass through the zone 50, as well as identification information, especially fingerprints and facial images or mug shots of known criminals, suspects, terrorists or any other individuals 56 that should not be admitted into the security zone 50.

Further, all data prerecorded into a database 30, 62 or subsequently stored in a database 30, 62 by the system 10 may be classified within the database 30, 62 or by any of the computers 22, 60. Thus, vehicle information may be classified by make and model, vehicle year, vehicle size or even frequency of the queries that the specific data file receives. Personal data may be grouped according to any standard in order to facilitate searching, such as facial size, skin tone, male/female, eye location, and the like.

In addition to the image analysis methods previously discussed, U.S. Pat. No. 6,111,671 to Bahuguna et al. discloses a fingerprint sensor and verification system; U.S. Pat. No. 5,359,669 to Shanley et al. discloses a retinal scan and verification system; and U.S. Pat. No. 6,396,954 to Kondo discloses voice recognition, the contents of which are incorporated herein by reference.

Thus, the system 10 may be capable of automatically identifying vehicle occupants 56 and other personnel 56 entering into the security zone 50 and recording the entry time and location.

The system 10 may be used to compare the prerecorded personal information contained in a database 30, 62 or an external database related to the identified license plate 54 with the observed information to verify the accuracy of the observed information. In addition, visual facial recognition images may be used to verify a driver's license photo associated with a detected license plate 54. In this regard, the intelligent video/audio observation and identification database system 10 constructs an individualized database 30 for a security zone 50 which is customized, in real time, to automatically detect a discrepancy and to flag observed criteria to facilitate safety and security for a desired zone 50 or checkpoint 52.

The intelligent video/audio observation and identification database system 10 is preferably sufficiently accurate to compare observed data to previously stored data to identify discrepancies such as whether or not a license plate 54 for a vehicle 70 has been switched with another vehicle, an automobile has been stolen, the drivers 56 of vehicles 70 do not match previously stored data, and/or whether or not the driver 56 satisfies profile criteria to warrant further investigation.

Further, separate zones 50 within the intelligent video/audio observation and identification database system 10 may be in communication with each other. For example, a building may have a first zone 50 defined as the exterior perimeter and parking structure, a second zone 50 for the building lobby, and an additional zone 50 for each floor of the building.

Additionally, separate intelligent video/audio observation and identification database systems 10 may be connected together, for example via the internet, for communication with one another. Separate intelligent video/audio observation and identification database systems 10 may be located in adjacent areas within the same building, in separate adjacent buildings, or even in another city or country.

The computer 22 for the intelligent video/audio observation and identification database system 10 may include an interface between any number of application specific databases 30, 62, which in turn may be coupled with screening and/or searching functions to identify vehicles 70 and/or individuals 56 within the United States. For example, a city such as Washington D.C. may have any number of government buildings and offices, including airports, each containing an intelligent video/audio observation and identification database system 10. A first preliminary screening inquiry may identify a vehicle 70 with a falsified license plate 54 and simultaneously a facial recognition system may identify an ethnic background for an individual 56. A second inquiry may search facial recognition data as stored within the FBI, CIA, INTERPOL, and/or other law enforcement databases for identification of the individual 56. A computer 22 for the intelligent video/audio observation and identification database system 10 may simultaneously send a message to all government buildings or other systems 10 to flag a database 30 search for a particular license plate 54 or facial or personal data recognition features. The vehicle 70 containing the matching license plate 54 or suspect individual 56 may thereby be tracked by the system 10 or various systems 10 recording each recognition occurrence as the vehicle 70 or individual 56 attempts to engage in reconnaissance activities around additional government buildings within a city. Upon recognition of a flagged condition, a signal may be sent to a surveillance, security, or law enforcement personnel as to the location of the vehicle 70 or individual 56 relative to government buildings within the city. The coupling of numerous intelligent video/audio observation and identification database systems 10 thereby facilitates investigation, interrogation, and apprehension of suspects located within or adjacent to security zones 50.

Further, the intelligent video/audio observation and identification database system 10 as coupled to other systems 10 integral to distant security zones 50 may, upon the flagging of a vehicle 70 or individual 56, initiate an inquiry to other security zones 50 of the network, such as other government buildings or other types of high security areas to request transmittal of information related to the flagged vehicle 70 and/or individual 56. Acknowledgment signals may thereby be passed and information transferred concerning dates, times, images, priority classification, and other prior recorded information as to the presence of the suspect vehicle 70 and/or individual 56 within other the security zones 50. The transmittal of information from remote security zones 50 in response to an inquiry may then be automatically processed for provision of a signal to a law enforcement, surveillance, or security officer to stop, interrogate, and/or implement additional searching related to a vehicle 70 and/or individual 56.

The intelligent video/audio observation, identification and database system 10 thereby provides a real time network of transmitted information for verification of data related to a vehicle 70 and/or individual 56 adjacent to or within a security zone 50. In real time officers are provided with the opportunity to apprehend and/or interrogate suspect individuals 56 and/or vehicles 70 on a significantly expedited basis.

Security zones 50 which may use the intelligent video/audio observation and identification database system 10 may include, but are not necessarily limited to, areas such as airports, embassies, hospitals, schools, government buildings, commercial buildings, power plants, chemical plants, garages, and/or any other location for which the monitoring of vehicle 70 or individual 56 traffic and/or security is desirable.

An intelligent observation and identification database system 10 may be arranged to learn the expected times for arrival and departure of individuals 56 and vehicles 70 from various zones 10. Each time an individual 56 or vehicle 70 enters or exits a security zone 50, the system 10 may record in the database 30 the time and location of the arrival or exit. Thus, over time, the system 10 may learn the expected arrival and departure times based upon the average of a predetermined number of instances, or by the most common of a range of predetermined times, such as normal shift times. Thus, if a vehicle 70 of individual 56 attempts to enter or exit a zone 50 at a time other than the learned expected time of entry or exit, the system 10 may alert security personnel to initiate an investigation.

A more detailed method of accumulation of security zone 50 database 30 information and network communication within a plurality of security zones 50 initiates upon further occurrences of observation and identification of vehicles 70 and license plates 54, as well as individuals 56.

The computer 22 may then store information within the database 30 pertaining to the vehicle 70 or individual 56 based any desired classification system, such as by license plate 54, and other retrieved identification information.

The computer 22 may record the time, date, license plate 54 number, facial or other type of recognition of the driver 56 and/or passengers or individuals, recorded images of the front, back, and sides of the vehicle 70 as well as the make, and model for storage within the database 30.

The computer 22 may also access pre-stored database 30 information to retrieve information related to the make, model, year, status, likely driver 56, driving record, criminal record, employment information and other personal information including a photo identification from a drivers license for a targeted vehicle 70 for display upon a monitor 40.

The computer 22 will next compare the observed data to the prerecorded and stored data to implement a search for any discrepancies.

If any threshold discrepancy is identified, a signal will be communicated to a security, surveillance, or law enforcement officer to initiate a more detailed investigation.

Further, if the computer 22 discovers any alerting information resulting from the database 30 search, such as an arrest warrant, the system may issue an alert to security personnel, as well as display all available image and recorded data pertaining to that person 56 or vehicle 70 upon a monitor 40, a plurality of monitors 40 in predetermined zones 50, or all monitors 40 within the system 10. The system may additionally issue an audible alert and a supplemental visual alert, such as a flashing light.

The intelligent video/audio observation and identification database system 10 may also retrieve pre-recorded images or other data from the database 30 concerning a subject vehicle 70 or person 56 which has been tracked within the security zone 50. This tracking feature allows security, surveillance, and/or law enforcement personnel to input as a query search for information concerning a suspect vehicle 70 or individual 56, resulting in the display of all available description information pertaining to the vehicle 70 or individual 56 for implementation of a search.

It is anticipated that the intelligent video/audio observation and identification database system 10 will obtain vehicle information at a security zone 50 entry station for the identification, storage of information within the database 30 and tracking of each and every recognized and/or unrecognized person 56 and every vehicle 70.

The information related to regular employees, such as vehicle 70 license plate 54, make and model, facial image recognition, and all other stored information is anticipated to be automatically verified at an entry station 52 for a security zone 50 by the input devices 12, 18 coupled to the computer 22 based upon database 30 searches and file comparisons. The information relative to a regular employee may be assigned a low level priority during profile searching, which in turn expedites and facilitates retrieval of information about vehicles 70 or individuals 56 which are unknown, or should otherwise be subject to a profile inquiry or investigation.

The intelligent video/audio observation and identification database system 10 may alert security personnel as to tasks that should be attended to, such as investigating a suspicious vehicle 70 or identifying an unknown person 56. Thus, the system 10 may generate a task log which may be displayed upon a monitor 40. The individual tasks within the task log may be automatically removed from the task log by the system 10 upon performance of the task, if the task is one that the system 10 is capable of sensing the completion of, such as entering a vehicle make and model. Further, all tasks may be manually removed from the task list by authorized personnel.

The intelligent video/audio observation and identification database system 10 may rank tasks in order of importance and priority. Desirably, a task list will be updated according to predetermined intervals of time, or whenever a task is added to or deleted from the list.

In this regard, the intelligent video/audio observation and identification database system 10 may have pre-programmed flags and/or thresholds for triggering of the provision of tasks or signals to a law, security, and/or surveillance officer. The computer 22 may be programmed to assess a point system or flag upon the recognition of certain images and/or profile characteristics relative to a vehicle 70, individual 56, and/or pedestrian being examined. The computer 22 will record and/or track the number of points or flags assigned to a particular vehicle 70, occupant 56, and/or pedestrian. When a certain number of flags and/or points have been assigned, according to a previously stored profile, then the computer 22 will emit or issue a signal to an officer, which may be ranked against other tasks in order of importance. An officer receiving the signal will desirably perform tasks according to the associated priority level, such as high priority, intermediate priority, low priority, or normal investigative priority to respond to the signal. The computer 22 may store any information or data collected pertaining to the task, as well as the instruction for the task itself in the database 30, for example in a subject file related to the vehicle 70, occupant 56, and/or pedestrian the task was associated with.

Further, priority levels with respect to tasks, and the threshold levels at which tasks are grouped into priority categories, may be adjusted by authorized personnel. Thus, stored data of previous officer priority assessments will be available for retrieval and analysis in order to adjust and/or recalculate a flag or point threshold for future contacts. For example, if a vehicle 70 has a certain number of flags and/or the occupant 56 has a certain number of flags according to a pre-programmed profile threshold, then the computer 22 may signal an officer. If the officer elects to assign a high priority, then the point or flag threshold for the vehicle 70 or individual 56 for future reference may be retained at the current level or reduced for more frequent inquiry. If the officer elects to assign a low priority, then the point or flag threshold for the vehicle 70 or occupant 56 may be increased to reduce the frequency of submission to an officer for a review of the priority selection.

In addition, it is anticipated that each optical input device 12 will be further electrically coupled to, and may be in communication with, a facial recognition system which may be integral to and/or independent of the intelligent audio/visual observation and identification database system 10. The communication between the facial recognition system and the intelligent audio/visual observation and identification database system 10 thereby facilitates the accumulation of further data related to a vehicle 70, vehicle occupants 56, and/or individuals 56 such as pedestrians. The computer 22 for the intelligent audio/visual observation and identification database system 10 may therefore efficiently and expeditiously signal a security and/or law enforcement officer when an unrecognized individual 56 is operating a particular motor vehicle 70.

The currently available computer 22 hardware and software enable the intelligent audio/visual observation and identification database system 10 to identify and track vehicles 70 and/or individuals 56 within a security zone 50 and compare the observed data in real time to previously stored data to assess the risk of criminal activity.

It is anticipated that the software as integral to the computer 22 for the intelligent video/audio observation and identification database system 10 will include processing capability from static optical devices 12 such as cameras, where the software may be used to track a person 56 or vehicle 70 within a zone 50. Such software will establish particular detail boxes and/or zones within a visualized image or group of images, such that the detail boxes will follow and track the transition of a specific object across a viewing zone. Tracking may be accomplished according to deciphering of image data as disclosed above. A vehicle 70 or group of vehicles 70 under investigation may therefore be specifically located within a security zone 50 and/or tracked to an unauthorized location. Upon the identification of an unpermitted presence of a vehicle 70 or group of vehicles 70 within an unauthorized section of a zone 50, the intelligent video/audio observation and identification database system 10 may immediately signal a law enforcement or security individual as to an unauthorized presence of a vehicle 70, group of vehicles 70, pedestrian, and/or individual 56 proximate to a restricted access zone 50.

The intelligent audio/visual observation and identification database system 10 may further be arranged to track vehicles 70 or individuals 56 as they move from zone 50 to zone 50. If a low level tracking priority is assigned to the vehicle 70 or individual 56, tracking may be accomplished by recording the location and time for each instance when the system 10 identifies the vehicle 70 or individual 56. Thus, a low level tracking priority may normally generate a log of when and where a vehicle 70 or individual 56 was seen. Over time, the system 10 may learn typical paths, times and zones 50 where specific vehicles 70 and individuals 56 spend their time. The system 10 may then issue an alert when a vehicle 70 or individual 56 deviates from their normal path. For example, if a person 56 normally may be found on second floor, and they occasionally pass through first floor, but have never gone to the fourth floor, then the system 10 may alert security personnel 56 if the person is identified by the system 10 on fourth floor.

Figure 8:
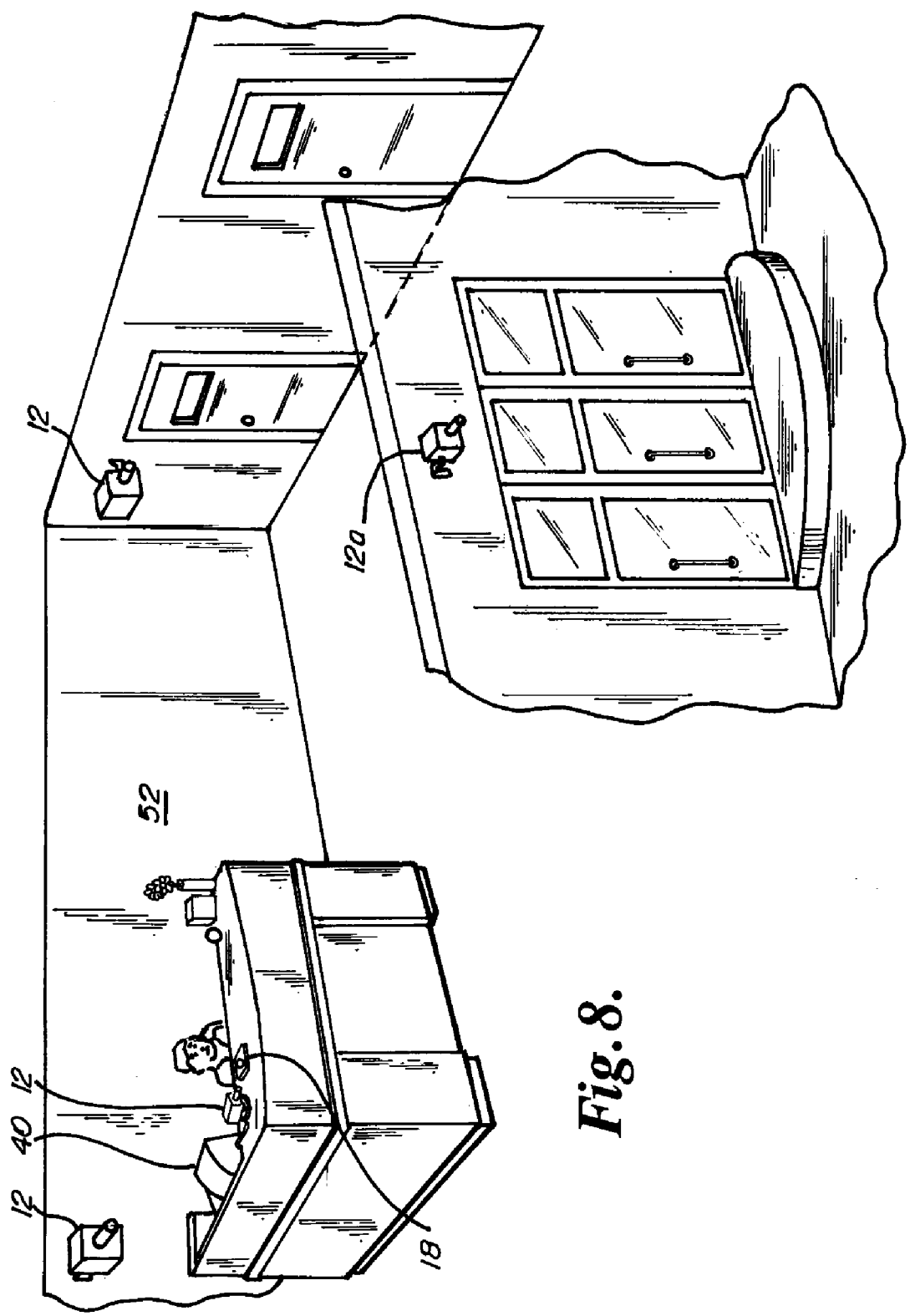
FIG. 8 depicts an environmental view of a room equipped with an intelligent observation and identification database system according to the present invention.

FIG. 8 depicts a room having multiple input devices 12, 18. The other input device 18 shown may be a palm reader. A plurality of cameras 12 may be located within a room. Another camera 12a may be mounted to observe activity outside the depicted room. Thus, the cameras 12 and 12a may be arranged to allow the system 10 to track a person 56 as the person approaches and enters the room, and as the person moves around within the room.

If a high level tracking priority is assigned to the vehicle 70 or individual 56, then continuous active tracking via software analysis of video image feeds is desirable. As such, the system may continually pinpoint the zone 50, and even the exact location of a person 56 within the zone 50.

The computer 22 for the intelligent audio/visual observation and identification database system 10 preferably includes software to search for discrepancies from previously normalized data representative of historic actions related to an individual 56 and/or a vehicle 70. The computer 22 for the intelligent audio/visual observation and identification database system 10 implements the recording of data to build vehicle 70/individual 56 specific files or histories, including images representative of activity within a security zone 50. The computer 22 may therefore compare current vehicle 70 or individual 56 activity against previously stored and recorded activity data to establish standard deviations or thresholds which may, in turn, trigger a signal or warning if current conduct is outside acceptable parameters and warrants further investigation by surveillance, security, and/or law enforcement officers.

A computer 22 may further track vehicles 70 or individuals 56 within the security zone 50 to identify the at rest position of the vehicle 70 or location of the individual 56 within the security zone 50. In addition, the computer 22 will track the subsequent repositioning of a vehicle 70 or individual 56 within a security zone 50.

The computer 22 may then implement a software subroutine which searches for one or more pre-stored profile searches as related to vehicles 70 and/or individuals 56 within the security zone 50.

In the event that a vehicle 70 and/or individual 56 is identified as satisfying any pre-established or customized profile parameters, then the computer 22 will track the vehicle 70 and/or individual 56 while simultaneously issuing a signal to security, surveillance, and/or law enforcement personnel to initiate an investigation. In addition, the computer 22 will initiate a communication to be received by other computers 22 as part of the security zone 50 network to establish a priority search for the targeted vehicle 70 and/or individual 56. The computer 22 will track a vehicle 70 and/or individual 56 through each zone 50 through various passive input devices 12, 18. Alternatively, the optical input devices 12 may include one or more active devices to track the motion of the vehicle 70 and/or individual 56 through rotation of the optical input device 12.

The computer 22 for the intelligent audio/visual observation and identification database system 10 enables surveillance, security, or police officers to select a desired period of time for searching in order to narrow initial investigations and facilitate expedited apprehension of terrorists/criminals. For example, if a death were to occur within a garage setting, and a time of death is established within an acceptable range, then the computer 22 for the intelligent audio/visual observation and identification database system 10 would identify each and every vehicle 70 and person 56 within a given zone 50 or group of zones 50 during the proscribed period of time, which in turn may identify any witnesses and/or the perpetrator of the crime.

Preferably, the computer 22 automatically initiates comparisons to search for discrepancies between observed and stored data as related to a variety of thresholds to issue a warning signal upon automatic detections of discrepancies. Alternatively, an individual security or law enforcement officer may issue a query to identify and/or tag a specific vehicle 70 or individual 56 for communication within the network of linked security zones 50 to advise all network locations to initiate a search for a particular vehicle 70 or individual 56, and/or prerecorded data related to a specific individual 56 or vehicle 70.

Similarly, the remote security zones 50 as part of the security zone 50 network may implement individual searches, desirably within the individual stored databases, for communication of information back to an originating computer 22. Alternatively, the computers 22 for the remote security zones 50 may initiate a search sub-routine to attempt to identify vehicles 70 and/or individuals 56 which have been previously flagged by another computer 22 as a member of the security zone 50 network. The identification and/or apprehension of vehicles 70 and/or individuals 56 is thereby enhanced through a network of computers 22 as related to individual security zones 50 within a geographic area such as a floor, building or even a city.

An individual user may implement a query and/or a search based upon customized parameters occurring within the security zone 50 within any previously recorded period of time. The computer 22 will generally assign differing levels of priority for the data to be stored and accumulated within the database 30. For example, a regular routine such as for an employee will be assessed a relatively low search priority, whereas instances of individual occurrences of conduct or presence may be assessed a relatively high search priority. The computer 22 will then filter, screen, and search groups of data within each priority classification to identify vehicles 56 and/or individuals 56 which satisfy the profile parameters. For example, a profile parameter may include all rental vehicles located within a security zone 50 during a particular period of time. In this instance, the computer 22 will assign a very low search priority to vehicles 70 driven by regular employees within the security zone 50. Further, the intelligent video/audio observation and identification database system 10 may in real time advise an officer that within the subject class under investigation, certain vehicles 70 and/or individuals 56 are located and are present within historically recorded and observed locations, while other particularly identified vehicles 70 and/or individuals 56 are not currently present or located at previously observed locations. An officer may thereby prioritize to expedite additional investigation as necessary.

The computer 22 may further implement a query to identify the current placement of all vehicles 70 and/or individuals 56 which have satisfied the profile search parameters. The computer 22 will then communicate to a security, surveillance, or law enforcement officer the location of the individuals 56 and/or vehicles 70 which satisfy the profile parameters within the security zone 50. In addition, the computer 22 may issue a detain signal to a security zone 50 check point and/or exit to prohibit and/or detain the departure of a targeted vehicle 70 and/or individual 56 from the security zone 50. The computer 22 may further communicate different levels of signals, for example signals to investigate, perform detailed investigation, temporarily detain, and/or prohibit exit from a security zone 50. The level of signal to be generated by the computer 22 may be established by a customized input from a security and/or law enforcement officer having preauthorized access to implement a more restrictive enforcement signal, or by traditional preset levels of importance. The optical input devices 12 as incorporated into a security zone 50 exit or checkpoint 52 may also identify the approach of a targeted vehicle 70 to an exit. A computer 22 for the intelligent audio/visual observation and identification database system 10 will then identify the exact location of the vehicle 70 and issue a position location signal to law enforcement, surveillance, and/or security personnel to facilitate the repositioning of the officers to the location of the targeted vehicle 70.

When the intelligent audio/visual observation and identification database system 10 is utilized in conjunction with a government structure such as an embassy, the computer 22 may further include sub-routines to identify and issue immediate investigation and/or warning signals upon the stoppage of certain types of vehicles 70 adjacent to an embassy. In addition, a timing sensitivity sub-routine may be incorporated into the software for the computer 22 to trigger a warning and/or investigation signal to an officer when a vehicle 70 is stopped adjacent to an embassy during certain periods of time. It is anticipated that the computer 22 for the intelligent audio/visual observation and identification database system 10 will additionally search for discrepancies between database 30 data and current observed data, in order to initiate the automatic communication of a warning or investigation signal to a surveillance, security, or law enforcement officer in appropriate situations. In this regard, the system 10 is desirably arranged to learn and recognize repetitive patterns within the accumulated database 30. Therefore, the computer 22 may assess a low query priority to repetitive and/or regular patterns, and implement a more expedited search related to non-regular pattern data as stored within the accumulated database 30. Any parameters may be selected for the recognition of patterns within a security zone 50 dependent upon individual environmental conditions and customized needs at each independent security zone 50. For example, six days of repetitive actions may be required to establish a regular pattern of conduct within a first security zone 50 where two months of repetitive conduct may be required to establish a regular pattern within a second security zone 50.

The computer 22 for the intelligent audio/visual observation and identification database system 10 may be arranged to continuously compare each observed encounter to the collection of previously stored data to identify patterns and deviations from the patterns as previously recorded. If no discrepancy is identified then the observed instance may be assigned a relatively low priority during profile query and/or searching.

During pattern learning, the computer 22 sensitivity may be established by the initial creation of a file and/or data pertaining to an individual. Next, the input of a desired amount of data representative of repeated actions may be required. The number or amount of data may represent 20, 50, 100, or 200, repetitive occurrences. The occurrences may be required to be within a certain classification, such as all within a certain zone 50, or all within a certain period of time during the day, such as between 3 and 4 o'clock p.m. The computer 22 may then calculate a mean value based upon the recorded data. Alternatively, the recorded data may be divided into more than one segment and a mean may be calculated for each desired segment. The computer 22 will generally continue to store data, and therefore update the pattern, as detected by the input devices 12, 18. The computer 22 is preferably designed to recalculate a mean for the data following each additional data entry. The computer 22 may include sensitivity trigger software which will identify a desired threshold deviation from the calculated mean which may be more or less than one standard deviation from the calculated mean. Alternatively, the sensitivity trigger may be established at a certain percentage for deviation from the calculated mean. The computer 22 continually compares the observed occurrence information to the calculated mean data to determine if investigation signals are required to be communicated to law enforcement and/or security officers. In this respect, the computer 22 is engaged in updating activities becomes smarter and more efficient in analyzing risk situations over time.

The intelligent audio/visual observation and identification database system 10 may also be simultaneously coupled to an audio recognition system 48 within a structure or at a guard station or checkpoint 52. The audio recognition system 48 may be included within the computer 22. Initially, the audio recognition system 48 comprises a plurality of transducers as electrically coupled to the computer 22 which has access to the database 30, which desirably contains stored data representative of vocal or other sounds, words, patterns of words, and/or phrases. The audio recognition system 48 may be an initial supplemental verification system for identification of an individual 56 who is a pedestrian or an occupant 56 of a vehicle 70. In addition, certain types of vehicles 70 may have unique engine or sound characteristics which may be compared to pre-recorded sound data to supplement visual identification and/or verification. The audio recognition system 48 may be further coupled to other verification systems for an individual 56 such as fingerprint, palm print, and/or eye scanners as previously disclosed.

The audio recognition system 48 may interpret vocal commands and input the commands into the intelligent audio/visual observation and identification database system 10, which may be in communication with building control systems 64. Thus, the intelligent audio/visual observation and identification database system 10 may be coupled to the operational systems for a structure, such as locking systems for doors, lighting systems, air conditioning systems, and/or heating systems. Thus, various building control systems 64 may be activated by authorized personnel through voice recognition of vocal commands through the intelligent audio/visual observation and identification database system 10 as received by the transducer and verified with respect to pre-stored data for the authorized person, or which may be automatically opened or activated based upon a signal generated by the computer 22 following the audio recognition of the authorized person, which may have occurred in the same zone 50 or at a previous checkpoint or verification location.

The intelligent audio/visual observation and identification database system 10 may also be coupled to sensors as disposed about a structure. The system may then build a database 30 with respect to temperature sensors within specific locations, pressure sensors, motion detectors, phone number identifiers, sound transducers, and/or smoke or fire detectors. Recorded data as received from various sensors may be used to build a database 30 for normal parameters and environmental conditions for specific zones 50 of a structure for individual periods of time and dates. The computer 22 may continuously receive readings/data from remote sensors for comparison to the prestored or learned data to identify discrepancies therebetween. In addition, the filtering, flagging and threshold procedures as earlier identified may be substantially duplicated with any desired adjustment to assigned points or flags for environmental area to indicate a threshold discrepancy to signal an officer to initiate an investigation. The reassignment of priorities and the storage and recognition of the assigned priorities occurs at the computer 22 to automatically recalibrate the assignment of points or flags for further comparison to a profile prior to the triggering of a signal representative of a threshold discrepancy.

The intelligent audio/visual observation and identification database system 10 may also be coupled to various infrared or ultraviolet sensors used for security/surveillance within a structure to assist in the early identification of an unauthorized individual 56 within a security zone 50 or the presence of an intruder without knowledge of the intruder.

The intelligent audio/visual observation and identification database system 10 as coupled to sensors and/or building control systems 64 for a structure which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

It is anticipated that the intelligent video/audio observation and identification database system 10 will track a vehicle 70 satisfying a profile within the security zone 50 as the vehicle 70 passes from one field of observation to another as related to individual optical devices 12 or other input devices 18. It is further anticipated that the intelligent video/audio observation and identification database system 10 will screen, and eliminate from a priority classification vehicles 70 having a regular pattern within the security zone 50. A regular pattern within the security zone 50 will likely be representative of an employee. Information is stored in the database 30 as related to vehicles 70 driven by employees, and/or employees are preferably assigned a low priority when searching is implemented in order to more rapidly identify a particular profile and/or classification of vehicles 70 or individuals 56 under investigation in the security zone 50.

It is anticipated that a security guard, surveillance individual, and/or guard station 52 will include or have access to a plurality of optical devices as positioned adjacent to an entry guard house, and an exit from the security zone 50, to monitor the entry and exit of vehicles 70 for tracking purposes. In addition, the intelligent video/audio observation and identification database system 10 will assist a security guard in the surveillance and/or tracking of a vehicle 70 within a security zone 50 where the vehicle 70 is either intentionally and/or inadvertently passing into an unauthorized location or zone 50. For example, a security guard assigned to an entry may issue a temporary pass and advise a vehicle 70 to park in Lot B. The optical devices 12 of the intelligent video/audio observation and identification database system 10 may then track the vehicle 70 which passes through Lot B and approaches a restricted area concerning Lot C. The intelligent video/audio observation and identification database system 10 may then trigger a visible, audible, and/or other signal to the law enforcement, surveillance, or security guard as to the unauthorized position of the vehicle 70 having a temporary pass outside of Lot B, whereupon additional investigation and/or assistance may be initiated to return the wayward vehicle 70 to the designed parking area.

The intelligent video/audio observation and identification database system 10 preferably includes a plurality of prerecorded profile searches which may be selected for initiation by a law enforcement, surveillance, and/or security personnel. The computer 22 of the intelligent video/audio observation and identification database system 10 upon identification of a vehicle 70 satisfying the implemented search profile will then track the vehicle 70 within individual optical fields or input device 12 line of sight, and through adjacent optical fields, to automatically monitor the location of the vehicle 70 within the security zone 50. The original identification of the vehicle 70 subject to investigation is preferably provided by the computer 22 comparing an observed vehicle 70 having information assigned from a standardized database 62, for comparison to the accumulated environmentally specific security zone 50 to identify discrepancies for assessment of risk to individuals and/or property.

The intelligent video/audio observation and identification database system 10 through the utilization of pre-set profile screening provides to law enforcement, surveillance, and/or security personnel early warning as to discrepancies between a vehicle 70/individual 56 and previously accessible databases 30, 62 to minimize risk of terroristic activities. In addition, the intelligent video/audio observation and identification database system 10 may be customized for real time profile screening for the provision of a warning to a law enforcement and/or security individual upon retrieval of a calculated or identified discrepancy between standardized data and observed data within the accumulated database 30.

It is anticipated that the intelligent video/audio observation and identification database system 10 at any given time may identify all vehicles 70 and all individuals 56 present within a security zone 50. The computer 22 for the intelligent video/audio observation and identification database system 10 automatically searches for patterns and deviations from patterns with respect to the accumulated database 30 for the triggering of an advisory signal to a law enforcement, surveillance, or security officer to initiate further investigation. The intelligent video/audio observation and identification database system 10 is preferably proactive and is continuously screening and comparing data being input from the input devices 12, 18 for comparison to the previously stored records within the accumulated database 30 to identify patterns for specific vehicles 70 and/or individuals 56 and to verify information related to the vehicles 70 and individuals 56 occupying the vehicles 70.

A desired number of vehicle 70 contacts and point or flag thresholds for individuals 56 and/or vehicles 70 may be adjusted to fulfill the level of security desired within a particular zone 50. During the entire evaluation and storage processing, the computer is recording not only images and data relative to a vehicle 70/individual 56, but also desirably recording data related to the sensitivity of the security level to be assigned to the particular vehicle 70 and/or individual 56. In this regard, the computer 22 becomes more intelligent when a variation in previously recognized parameters is not satisfied. For example, if a vehicle driver 56 is identified to be different from the typical driver as defined by a number of previously recorded consistent occurrences, then a high priority flag or a large number of points may be assigned to the observed vehicle 70, in real time, to advise a surveillance, security, and/or law enforcement officer to initiate a priority investigation. The computer 22 may store data in tables, and group files within set folders having similar priority thresholds. In this regard, the computer 22 may implement filters of all files, and/or folders to screen and organize an ordered search to satisfy a particular desired profile. Therefore, the longer the intelligent audio/visual observation and identification database system 10 is utilized within a specific security zone 50, the more customized the system 10 becomes to addressing the requirements of the specific zone 50 to provide a desired level of security. In addition, an optical assist system as a portion of the intelligent audio/video observation and identification database system 10 may recognize images for processing within a computer to automatically formulate tables, filters, and/or thresholds for a particular vehicle 70 within a security zone 50 based upon observed and recognized patterns without officer input. For example, the computer 22 may be programmed to automatically evaluate the number of points, and/or flags to trigger officer intervention based upon the desired number repetitive occurrences. In this regard, the system automatically may establish customized thresholds, filters, and/or tables for a security zone 50 minimizing officer input.

The use of pre-stored profile queries in conjunction with manual customized queries enhances the performance of the intelligent video/audio observation and identification database system 10 for apprehension and deterrence of terrorist acts within a safety zone 50. The use of pre-stored and/or customized profiles expedites the searching of vehicles 70 and/or facial recognition data by narrowing investigation to priority classifications of individuals 56 and/or vehicles 70. Any group of vehicles 70 and/or individuals 56 which have been targeted as fulfilling the requirements of the profile search may then be targeted for identification of the location of the targeted vehicles 70 due to the previous tracking features of the intelligent video/audio observation and identification database system 10. Apprehension efforts are thereby facilitated prior to and following an event.

The intelligent video/audio observation and identification database system 10 includes a vehicle 70 tracking function and software to specifically identify the location of all vehicles 70 within a security zone 50. In addition, the intelligent video/audio observation and identification database system 10 may be coupled to an input device 12, 14 integral to a facial recognition system, fingerprint system, palm print system, and/or voice or handwriting identification system to facilitate the identification and tracking of individuals 56 and/or vehicles 70 within a security zone 50.

The intelligent audio/visual observation and identification database system 10 is preferably designed to track the presence of all employees within a particular security zone 50. In addition, the computer 22 of the intelligent audio/visual observation and identification database system 10 evaluates and compares matters which occurred yesterday, to matters currently unfolding during today, in conjunction with the use of filters to minimize errors with respect to the identification of classifications and/or groups of vehicles 70 or individuals 56 to receive further investigation. In addition, a particular profile may be established for a group of vehicles 70 such as a motorcade. An additional filter may search and detect an authorized vehicle 70 within an observed motorcade. In addition, a processor/controller may search optical images observed at a specific checkpoint 52 to identify a particular group of vehicles 70 such as a motorcade. If any deviation in the number or type or other factors as related to the group of vehicles 70 is detected, then the computer 22 may issue an immediate warning signal to a surveillance, security, and/or law enforcement officer as to the necessity for an immediate investigation or warning. In addition, a particular group of optical devices 12 as in communication with a computer 22 may recognize the deviation of a group of vehicles 70 from a pre-planned or normal travel route to issue an investigation and/or warning signal to an officer. Generally, the filter sensitivity for the computer 22 of the intelligent audio/visual observation and identification database system 10 will involve one standard deviation from the normal data as previously stored for a particular vehicle 70, individual 56, group of vehicles 70, and/or occupants 56 of vehicles 70. Therefore, in the event that observed data for a particular vehicle 70 having an identifiable license plate 54 statistically insignificantly deviates from the prerecorded data, then the computer 22 will not issue a communication to initiate additional investigation into the presence of the vehicle 70 within the security zone 50. However, in an example wherein an employee having normal work hours of 8 to 5, Monday through Friday as recorded data within the database 30 is identified as being adjacent to a secured area at 3:30 a.m. on a Sunday morning, then the computer 22 for the intelligent audio/visual observation and identification database system 10 will automatically issue a warning signal to initiate immediate appropriate investigation based upon a weighted signal generated by the computer 22.

The intelligent audio/visual observation and identification database system 10 may be used in conjunction with a government structure such as an embassy. In this example, a plurality of optical recording devices 12 may be positioned to observe, identify, and record the passage of vehicles 70 past the embassy. The intelligent audio/visual observation and identification database system 10 generally creates a file for each individual vehicle 70 which passes the embassy. The vehicle 70 license plate 54 number, make, model, observed load, and time and date are generally stored within the individual vehicle 70 file. The computer 22 for the intelligent audio/visual observation and identification database system 10 may separate the data within a particular vehicle file into categories which may include occurrences which have been observed between 12:01 a.m. and 11:59 p.m. as a first category and noon to midnight as a second category. Any number of time or other confirmed categories may be established to satisfy the requirements of a customized application. The computer 22 for the intelligent audio/visual observation and identification database system 10 will then calculate a mean value with respect to time of passage of an embassy for the identified vehicle 70 within each category, and will further calculate the mean observed appearance of the vehicle 70 with respect to load. Sensitivity software may be incorporated into the computer 22 for the intelligent audio/visual observation and identification database system 10 which is designed to trigger a warning and/or flag in the event that observed data exceeds a calculated mean value by a selected percentage or value. For example, if a vehicle 70 is observed to be approaching an embassy at 3:30 in the morning where the calculated mean values for the first category are 7:45 a.m. and for the second category 5:45 p.m. then a signal may be communicated to a law enforcement, surveillance, or a security officer to trigger heightened security for the embassy. In addition, the intelligent audio/visual observation and identification database system 10 may observe a vehicle 70 approaching an embassy to compare the observed vehicle 70 appearance with respect to load to pre-stored data and/or a pre-calculated observed mean with respect to the vehicle 70 as related to load. In the event that the vehicle 70 appearance exceeds the observed mean value with respect to load, and/or the standard database value with respect to load, by an amount of five percent or more, then a signal will be generated for communication to a law enforcement, surveillance, and/or security officer to exercise heightened security measures for the embassy.

The types of applications identified herein is intended as supplemental intelligent information gathering and automatic analysis for use in conjunction with the intelligent audio/visual observation and identification database system 10 with respect to vehicles 70, occupants 56, and/or pedestrians as described herein.

The intelligent audio/visual observation and identification database system 10 may also be a method for identifying security investigations comprising:
a) establishing a security zone;
b) positioning at least one optical input device to observe the security zone;
c) connecting the optical input devices to a computer;
d) observing occurrences within the security zone and communicating the observed occurrences to the computer;
e) storing the observed occurrences within the computer to create a database for the security zone;
f) processing the observed occurrences within the computer as compared to stored or retrieved data available to the computer; and
g) issuing a signal to a security officer to investigate an occurrence.

The intelligent audio/visual observation and identification database system 10 may also be an apparatus for identifying a vehicle and likely driver comprising:
an optical input device;
a computer;
a database containing information;
and a display;
wherein said computer receives an image of an approaching vehicle's license plate from said optical input device, said computer searches said database and identifies information relevant to the license plate and identifies an expected driver of the vehicle;
and wherein said computer receives an actual driver image of said vehicle's actual driver from said optical input device, said computer compares said actual driver image with a prerecorded image of the expected driver and determines whether the actual driver image is substantially similar to said expected driver image.

Enclosed herewith and incorporated by reference herein are the following U.S. Pat. Nos. 6,400,828; 6,396,954; 6,389,155; 6,181,805; 6,121,898; 6,111,671; 6,081,206; 6,072,893; 6,035,053; 6,035,055; 6,035,074; 5,948,038; 5,946,417; 5,875,261; 5,831,155; 5,809,161; 5,734,337; 5,710,833; 5,568,406; 5,381,155; 5,359,669; 5,182,647; 5,164,992; and 4,368,979.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

I claim:

1. An apparatus for at least one security zone said apparatus comprising:
   a plurality of optical input devices;
   at least one computer, said at least one computer being in communication with said plurality of optical input devices, said at least one computer compiling an evolving database, said evolving database comprising individual files representative of at least one individual or object within said at least one security zone;
   comparison software in communication with said at least one computer and said evolving database;
   and a display in communication with said at least one computer;
   wherein said at least one computer is constructed and arranged to process information from said evolving database and information from said at least one security zone for issuance of at least one investigation signal.

2. The apparatus of claim 1, further comprising sensitivity software in communication with said at least one computer and said evolving database.

3. The apparatus of claim 2, further comprising a plurality of computers.

4. The apparatus of claim 3, wherein at least one of said plurality of computers is located within at least one of said at least one security zone.

5. The apparatus of claim 4, wherein said plurality of computers are in communication with each other.

6. The apparatus of claim 5, wherein at least one of said plurality of computers is in communication with at least one external database.

7. The apparatus of claim 6, each of said plurality of computers comprising an evolving database.

8. The apparatus of claim 7, wherein at least one of said plurality of computers comprises at least one defined profile.

9. The apparatus of claim 8, wherein said at least one defined profile is constructed and arranged as a search query for communication with said evolving database.

10. The apparatus of claim 9, wherein said sensitivity software includes probability analysis software.

11. The apparatus of claim 10, wherein said probability analysis software is in communication with threshold criteria for issuance of said at least one investigation signal.

12. The apparatus of claim 11, wherein said sensitivity software ranks said at least one investigation signal as selected from the group consisting of high priority, intermediate priority, low priority, and normal priority.

13. An apparatus for at least one security zone said apparatus comprising:
    a plurality of optical input devices;
    at least one computer, said at least one computer being in communication with said plurality of optical input devices, said at least one computer compiling an evolving database, said evolving database comprising individual files representative of at least one individual or object within said at least one security zone;
    sensitivity software in communication with said at least one computer and said evolving database;
    and a display in communication with said at least one computer;
    wherein said at least one computer is constructed and arranged to process information from said evolving database with said sensitivity software for issuance of at least one investigation signal.

14. The apparatus of claim 13, further comprising comparison software in communication with said at least one computer and said evolving database, said sensitivity software comprising probability analysis software, wherein said probability analysis software is in communication with threshold criteria for issuance of said at least one investigation signal.

15. The apparatus of claim 14, further comprising a plurality of computers, wherein at least one of said plurality of computers is located within at least one of said at least one security zone.

16. The apparatus of claim 15, wherein at least one of said plurality of computers is in communication with at least one external database, at least one of said plurality of computers comprises at least one defined profile, and wherein said at least one defined profile is constructed and arranged as a search query for communication with said evolving database.

17. An apparatus for at least one security zone said apparatus comprising:
    a plurality of optical input devices;
    at least one computer, said at least one computer being in communication with said plurality of optical input devices, said at least one computer compiling an evolving database, said evolving database comprising individual files representative of at least one individual or object within said at least one security zone;
    comparison software in communication with said at least one computer and said evolving database;
    sensitivity software in communication with said at least one computer and said evolving database;
    and a display in communication with said at least one computer;
    wherein said at least one computer is constructed and arranged to compare information from said evolving database and information from said at least one security zone for issuance of at least one investigation signal.

18. The apparatus of claim 17, said sensitivity software comprising probability analysis software, wherein said probability analysis software is in communication with threshold criteria for issuance of said at least one investigation signal.

19. The apparatus of claim 18, further comprising a plurality of computers, wherein at least one of said plurality of computers is located within at least one of said at least one security zone.

20. The apparatus of claim 19, wherein at least one of said plurality of computers is in communication with at least one external database, at least one of said plurality of computers comprises at least one defined profile, and wherein said at least one defined profile is constructed and arranged as a search query for communication with said evolving database.

* * * * *